(12) United States Patent
Müller

(10) Patent No.: US 6,826,680 B2
(45) Date of Patent: Nov. 30, 2004

(54) MICROCONTROLLER WITH MEMORY CONTENT DEPENDENT CONDITIONAL COMMAND DECODER FOR ACCESSING DIFFERENT MEMORY TYPES

(75) Inventor: Detlef Müller, Barsbuettel (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 550 days.

(21) Appl. No.: 09/888,458

(22) Filed: Jun. 25, 2001

(65) Prior Publication Data
US 2002/0040430 A1 Apr. 4, 2002

(30) Foreign Application Priority Data
Jun. 27, 2000 (DE) .......................................... 100 31 223

(51) Int. Cl.⁷ ............................................... G06F 15/00

(52) U.S. Cl. ............................ 712/226; 711/1; 711/5; 712/209

(58) Field of Search ................................ 711/1, 5, 101; 712/209, 226

(56) References Cited

U.S. PATENT DOCUMENTS

| | | | | |
|---|---|---|---|---|
| 4,481,570 A | * | 11/1984 | Wiker | 711/5 |
| 5,805,913 A | * | 9/1998 | Guttag et al. | 712/209 |
| 5,918,242 A | * | 6/1999 | Sarma et al. | 711/5 |
| 5,996,070 A | * | 11/1999 | Yamada et al. | 712/236 |
| 6,032,247 A | * | 2/2000 | Asghar et al. | 712/35 |
| 6,052,773 A | | 4/2000 | DeHon et al. | 712/43 |
| 6,381,190 B1 | * | 4/2002 | Shinkai | 365/230.03 |

FOREIGN PATENT DOCUMENTS

WO 8607174 A1 12/1986

\* cited by examiner

Primary Examiner—Kenneth S. Kim
(74) Attorney, Agent, or Firm—Aaron Waxler

(57) ABSTRACT

In a microcontroller (100) the command decoder (15) has access to at least one memory (14). The command decoder may thus be adapted to decode at least one conditional command, while the result of decoding the conditional command is dependent on the contents of said memory (14). The microcontroller according to the invention thus provides the possibility of considerably reducing the programming effort so that both the system performance and the code density can be significantly increased with a small additional number of hardware components.

3 Claims, 1 Drawing Sheet

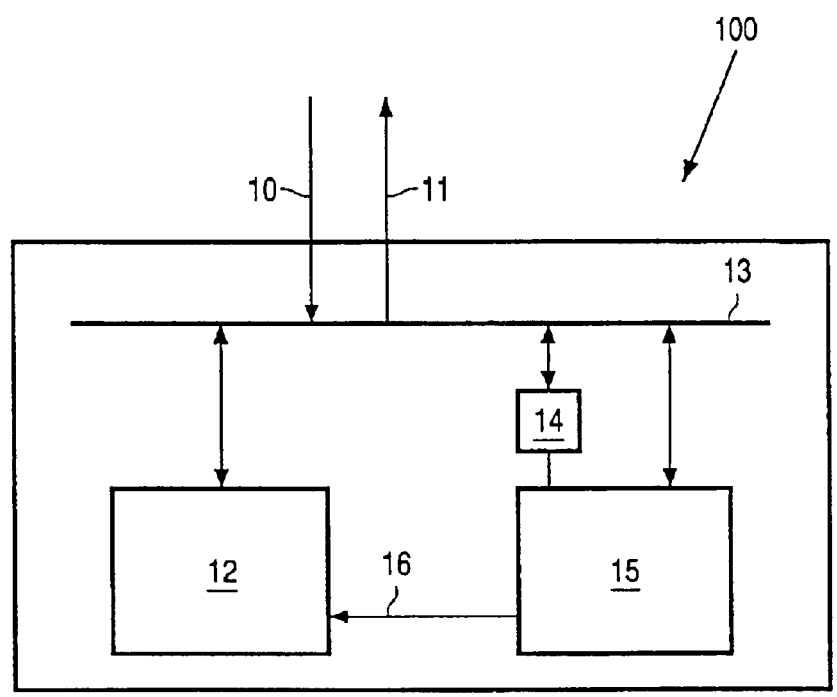

MICROCONTROLLER WITH MEMORY CONTENT DEPENDENT CONDITIONAL COMMAND DECODER FOR ACCESSING DIFFERENT MEMORY TYPES

The invention relates to a microcontroller comprising a command decoder.

Single-chip microcomputers which are generally used for controlling apparatuses and in which CPU, memories and ports are integrated on a chip are understood to be microcontrollers. The CPU comprises in known manner a command decoder which decodes the loaded commands and performs a run-off control in order that the commands are carried out by the computer.

Microcontrollers are programmed in a machine-dependent assembler language. In the known assembler languages, all assembler commands, with the exception of the conditional program steps, are executed independently of data. When different operations must be performed in dependence upon given data, this is possible in conventional microcontrollers only with a considerable programming effort. The condition to be realized must then be extensively encoded in the assembler. When, for example, generic pointers in a high-level language compiler are to be programmed by means of different assembler commands dependent on the addressed memory, this requires a high programming effort or, by substitution, a considerable number of hardware components for reconfiguring the memory.

Based on this background, it is an object of the present invention to improve a microcontroller of the type described in the opening paragraph as regards its functionality and to simplify the programming.

This object is achieved by a microcontroller as defined in the characterizing part of claim 1. Advantageous embodiments are defined in the dependent claims.

The microcontroller comprises a command decoder as well as at least one memory to which the command decoder has direct access. The command decoder is adapted to decode at least one conditional command, the result of the decoding of the conditional command depending on the contents of the memory to which the decoder has access. When the command decoder thus loads a conditional command, it checks the contents of the memory to which it has access and, in dependence upon the result of this check, it supplies a machine command from a series of possible machine commands, which are associated with the loaded conditional command, to the computer. The memory, to which the microcontroller has access, may be particularly a register which is present on the microcontroller.

Due to its mode of operation, the microcontroller according to the invention allows a considerably greater flexibility in its use and in programming without extensive changes in the structure of the hardware being necessary. A conditional command can be used for programming in the same way as conventional assembler commands. When executing the program code, it ensures a greater flexibility because the actually performed instruction depends on the data which are present at the instant of forming this instruction in the memory to which the command decoder has access.

The memory, to which the command decoder has access, is preferably adapted in such a way that it can comprise input data of the microcontroller. Input data of the microcontroller may be particularly digital or digitized information supplied by a connected apparatus.

In accordance with a special embodiment of the invention, the command decoder is adapted in such a way that, dependent on the contents of the memory to which the command decoder has access, the conditional command is decoded as an access command for the computer to different memory types. The access to different memory types, starting from the same conditional command, is a frequently occurring situation of use in which the embodiment of the microcontroller according to the invention is particularly advantageous. Numerous microcontrollers have different assembler commands for access to different memories. For example, the microcontroller 80C51 has the command "mov" for moving data memory data and the command "movc" for code memory data. A generic pointer (for example in the high-level language C) which has address-controlled access to the overall implemented memory is possible for such microcontrollers with either considerable assembler code effort or with additional hardware-supported memory configurations (memory mapping). In contrast, the implementation of a data-controlled, conditional command with a single program command allows access to all implemented data memories, because the relevant desired instruction is decoded in dependence upon the data, for example, dependent on the contents of a processor register as a pointer. This operation has the external effect of access to a linear memory. It is therefore a great advantage that, for example, memory management units which are provided can be used without any change in spite of virtual reconfiguration of the memory.

The sole FIGURE diagrammatically shows the elements of a microcontroller 100 according to the invention.

The FIGURE only shows the arithmetic-logic unit ALU 12 and the command decoder 15 as logic components of the microcontroller 100 shown in a very simplified form. The ALU 12 and the command decoder 15 are connected to a common bus 13 to which the inputs 10 and outputs 11 of the microcontroller are also connected. The command decoder 15 further has a direct connection 16 with the ALU 12 via which the run-off control is performed.

According to the invention, the command decoder 15 has direct access to a memory 14 which may be, for example, a register of the microcontroller. Data of different origin, for example, data from an input 10 of the microcontroller, may be loaded into the memory 14.

The command decoder 15 is adapted in such a way that it can perform conditional commands. In the case of a conditional command, the command decoder 15 selects one out of a plurality of associated machine commands in dependence upon the contents of the memory 14 and supplies this command to the ALU 12. For example, the command decoder may supply the command mov or the command movc to the ALU in dependence on the contents of the memory 14. However, in both cases, the starting point is the same conditional assembler command so that a distinction in this respect is not required during programming. The microcontroller according to the invention thus provides the possibility of considerably reducing the programming effort so that both the system performance and the code density can be significantly increased with a small number of additional hardware components.

Reference Numerals:

| | |
|---|---|
| 100 | microcontroller |
| 10 | input connection |
| 11 | output connection |
| 12 | computer |
| 13 | bus |
| 14 | memory |

-continued

| 15 | command decoder |
| 16 | connection |

What is claimed is:

1. A microcontroller (100) comprising a command decoder (15), at least one memory (14) to which the command decoder has access, the command decoder being adapted to decode at least one conditional command, such that the result of the decoding of the conditional command is dependent on the contents of said memory, a computer (12) having a direct connection (16) to said command decoder, and a common bus (13) having input (10) and output (11) connections, with said computer, said command decoder and said memory all being directly connected to said common bus.

2. A microcontroller as claimed in claim 1, characterized in that the memory (14), to which the command decoder has access, is adapted in such a way that it can include input data of the microcontroller.

3. A microcontroller as claimed in claim 1, characterized in that the command decoder (15) is adapted in such a way that, dependent on the contents of the memory (14), to which the command decoder has access, a conditional command is decoded as an access command for the computer (12) to different memory types.

* * * * *